United States Patent [19]

Durboraw, III

[11] Patent Number: 5,768,319

[45] Date of Patent: Jun. 16, 1998

[54] GPS DATA COLLECTION IN HIGH NOISE-TO-SIGNAL RATIO ENVIRONMENTS

[75] Inventor: Isaac Newton Durboraw, III, Scottsdale, Ariz.

[73] Assignee: Motorola, Inc., Schaumburg, Ill.

[21] Appl. No.: 801,895

[22] Filed: Feb. 18, 1997

[51] Int. Cl.$^6$ ............................................ H04L 27/06
[52] U.S. Cl. ........................ 375/316; 375/324; 375/375; 342/357; 371/49.1
[58] Field of Search ........................ 375/316, 329, 375/200, 376, 340, 324, 344, 375, 327; 342/352, 355, 356, 357–358; 455/3.2; 370/503, 506, 509, 510, 517; 371/49.1, 49.2, 49.3

[56] References Cited

U.S. PATENT DOCUMENTS

| | | | |
|---|---|---|---|
| 4,807,256 | 2/1989 | Holmes et al. | 375/200 |
| 4,821,294 | 4/1989 | Thomas, Jr. | 375/200 |
| 4,894,662 | 1/1990 | Counselman | 342/357 |
| 4,972,431 | 11/1990 | Keegan | 375/200 |
| 5,343,209 | 8/1994 | Sennott et al. | 342/357 |
| 5,519,403 | 5/1996 | Bickley et al. | 342/352 |

*Primary Examiner*—Wellington Chin
*Assistant Examiner*—Conguan Tran
*Attorney, Agent, or Firm*—Bradley J. Botsch

[57] ABSTRACT

In a Global Positioning System (GPS) receiver, a significant improvement in the detection of GPS data in the presence of high interference levels is provided. In the receiver, data from multiple frames of GPS data are stacked in a memory. The stacked data is then utilized to determine the GPS data.

20 Claims, 3 Drawing Sheets

GPS DATA COLLECTION IN HIGH NOISE-TO-SIGNAL RATIO ENVIRONMENTS

BACKGROUND OF THE INVENTION

This invention pertains to Global Positioning System (GPS) receivers.

The Global Positioning System (GPS) may be used to determine the position of a GPS receiver on or near the surface of the earth from signals received from a constellation of satellites. The orbits of the GPS satellites are arranged in multiple planes in order that signals can be received from at least four satellites at any position on earth. More typically, signals are received from six or eight satellites at most places on the earth's surface.

Orbits of GPS satellites are determined with accuracy from fixed ground stations and are relayed to the spacecraft. The latitude, longitude and altitude of any point close to the surface of the earth can be calculated from the times of propagation of the electromagnetic signals from four or more of the satellites. A measured range, referred to as a "pseudorange", is determined between the GPS receiver and the satellites based upon these propagation times. The measured range is referred to as pseudorange because there is typically a time offset between timing clocks on the satellites and a clock within the GPS receiver. To determine a three dimensional position, at least four satellite signals are needed to solve for the four unknowns represented by the time offset and the three dimensional position.

The nature of the signals transmitted from the GPS satellites is well known from the literature. Each GPS satellite transmits two spread spectrum, L-band carrier signals, referred to as L1 and L2 signals. Two signals are needed if it is desired to eliminate any error that arises due to refraction of the transmitted signals by the ionosphere. The signals from each GPS satellite are Binary Phase Shift Keyed (BPSK) modulated by two pseudorandom codes in phase quadrature. A pseudorandom code sequence is a series of numbers that appear to be random when viewed over a subset of the code length but which are are generated using a finite length linear feedback shift register and therefore are generally characterized with period behavior. Using a binary pseudorandom code to modulate the phase of a carrier signal produces a suppressed carrier spread spectrum signal. The L2 signal from each satellite is BPSK modulated by only one of the pseudorandom codes. Use of the pseudorandom codes allows use of a plurality of GPS satellite signals for determining a receiver's position and for providing navigation information. A signal transmitted by a particular GPS satellite is selected by generating and matching, or correlating, the pseudorandom code for that particular satellite. Some of the pseudorandom codes are known and are generated or stored in GPS receivers. Other pseudorandom codes are not publicly known.

A first known pseudorange code for each GPS satellites is referred to as a "clear acquisition" or C/A code. A second known pseudorandom code for each GPS satellite is referred to as a "precision" or P/Y code. The C/A code for any GPS satellite has a period of 1 millisecond before it repeats and is intended to facilitate rapid satellite signal acquisition and hand over to the P/Y cod. (The Y code is simply an encrypted version of the P code). The P/Y code is a relatively fine grained code with a very long length (through encryption this code is transformed to a non-repeating code,. and is intended to provide greater tracking precision as well as security against enemy exploitation of the higher resolution signal.

In GPS receivers, signals corresponding to the known P/Y code and C/A-code may be generated in the same manner as in the satellites. The signals from a given satellite are demodulated by aligning the phases. i.e., adjusting the timing of the locally generated codes with those received from the satellites. To achieve phase alignment, the locally generated code replicas are correlated with the received satellite signals until the resultant output signal reaches a peak. Because the time at which each particular bit of the pseudorandom sequence is transmitted from the satellite is defined, the time of receipt of a particular bit can be used as a measure of the range to the satellite. Because the C/A and P/Y codes are unique to each GPS satellite, a specific satellite may be identified based on the results of the correlation between the received GPS signals and the locally generated C/A and P/Y code replicas. Methods for generating the C/A code and P/Y code are set forth in various publicly available publications.

The C/A code component of the L1 signal is provided for commercial use. Various techniques have been developed to replicate the C/A code in GPS receivers. As a consequence of the repetition of the C/A-code approximately once every millisecond, correlation at the GPS receiver may be performed in the absence of precise knowledge of the time of transmission of each C/A code bit. Acquisition of the C/A code and especially the P/Y code is dependent on precise time alignment of a locally generated replica of the desired code with the received satellite signal. The GPS signals are intended to be recovered by correlating each incoming signal with a locally generated wave form. In some, but not all cases, acquisition of the P/Y code is achieved from a handover of "time" from the C/A code. The result of such correlation is that the carrier in the GPS signals is totally suppressed when the modulating signal is the pseudorange code sequence like the P/Y code or the C/A-code. The locally generated code is adjusted in timing to provide an optimum correlation with the incoming signal. The correlation output is then a single narrow band peak centered at the carrier frequency. The carrier recovered by correlation provides the best available signal-to-noise ratio.

Users of GPS systems are particularly concerned about the potential of interference or jamming. Several forms of jamming may be used against a GPS user receiver. Generally these are classified as either "smart" spoofing type jammers or noncoherent broadband jamming. The Y code is effective for defense against the smart spoofing jammers as well as broadband jamming, since the Y code cannot be easily duplicated by an adversary controlling a jamming power source. However, under conditions of server broadband interference, even the Y code is vulnerable and performance of the GPS receiver will be compromised. As the jamming power increases, bit errors will occur in detecting the data that is modulated on the GPS signals. Since this data is crucial in using the tracked signal measurements for performing the navigation calculations necessary to establish position, user portion will be denied.

Hence, there exists a need for a method and apparatus for accurately receiving GPS signals in high noise-to-signal environments.

BRIEF DESCRIPTION OF THE DRAWINGS

The invention will be better understood from a reading of the following detailed description of a preferred embodiment of the invention in which like reference designators indicate like elements in the various Figures and in which.

DETAILED DESCRIPTION OF THE DRAWINGS

The present invention is directed to the problem of receiving the GPS signal in an environment that is cluttered with lots of interference and is particularly applicable to a hostile jamming environment. More specifically, the invention is directed to reception of GPS signals having a low signal-to-noise (S/N) ratio.

One method of combating interference is to detect an increase in signal levels or to detect higher levels of noise on received signals. A second method is to detect inconsistencies in the signals received from the satellites when signals from more than four satellites are being received. This second arrangement is based upon the well-known pseudorange measurement that are fundamental to GPS operation. Typically, signals from at least four satellites are needed to make the calculations necessary to determine position. When signals are received from more than four GPS satellites, more measurements are made than are strictly required to determine position. These additional calculations may be used to determine whether any of the measurements are corrupted. If the measurements are not consistent, then it is apparent that interference is occurring. Since a typical GPS receiver can track up to six or eight satellites simultaneously, this approach is well within the scope of available technologies.

The desired GPS signal is extracted from the noise through a process of filtering at lower and lower frequencies. However, the navigation data occurring at a 50 Hz data rate must be decoded from the GPS signal. This data rate sets a lower frequency limit for filtering of the jamming interference. With this frequency limit, the jammer suppression is the ratio of chipping rate-to-data rate and is 53.1 dB for the case of the Y code GPS signal. If the interfering signal radiated power level input at the receiver antenna is 53.1 dB above the GPS signal level, the GPS signal and interference would be statistically equal at data bit detection. A low probability of bit error in the message implies that jammer-to-signal (J/S) ratio must be significantly less than 53.1 dB.

For tracking the GPS signal under adverse signal conditions, the frequency tracking method can be used to achieve a reduced tracking bandwidth that is lower than the frequency limit set by the data rate. This method relies on measurement of phase difference over a sampling interval that is short relative to the data bit. By adding these phase differences over a much longer interval, for example 1 second, an average indication of phase difference can be used to reset a Numerically Controlled Oscillator (NCO) frequency to null the average phase difference measured over the averaging period.

Figure 1:
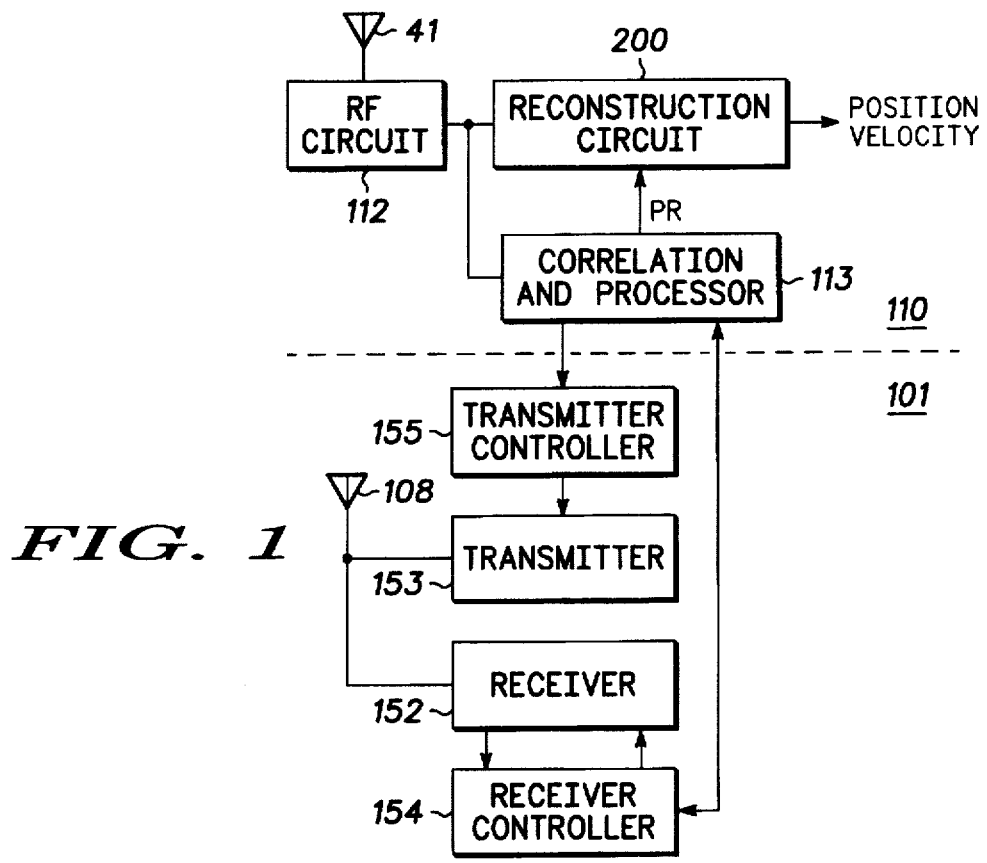
FIG. 1 is a block diagram of a GPS receiver to which the invention is particularly advantageously applied.

Turning now to FIG. 1, a GPS transceiver arrangement is shown. The transceiver is a Search and Rescue (SAR) transceiver. The SAR transceiver includes a GPS module 110 and a communications module 101. The communications module 101 includes an antenna 108 which is designed to operate at the frequencies at which SAR radios operate.

Module 101 includes a receiver 152 and a transmitter 153. Both the receiver 152 and the transmitter 153 utilize the same antenna 108. Alternatively, separate antennas may be utilized by each of the transmitter 153 and the receiver 152 to permit full duplex operation of the transceiver. Receiver 152 is connected to a receiver controller 154. The receiver controller 154 functions to control the operation of the receiver 152 and to receive interrogation requests output from the receiver 152 to determine whether to activate the transmitter 153. The transmit controller 155 controls the operation of the transmitter 153 and also provides information to be broadcast by the transmitter 153. The transmit controller 155 receives GPS position information from the GPS module 110 and provides the information to the transmitter 153 for transmission.

The GPS module includes an antenna 41 which receives signals from a constellation of GPS satellites. The antenna 41 is of conventional design and receives the L-band signals from the GPS satellites. Appropriate Radio Frequency (RF) processing circuitry 112 of conventional design is provided to extract the baseband signals from the L-band received signals. The output of the RF circuitry 112 is coupled to various correlation circuits and other GPS processing circuitry 113 to produce pseudorange outputs and GPS baseband signals which are processed by the data reconstruction circuits 200 of the invention, which are shown in detail in FIG. 2.

Details of SAR transceivers are shown and described in U.S. Pat. No. 5,519,403 which is assigned to the same assignee of the present invention. The teachings of the aforementioned patent are incorporated herein by reference.

Figure 2:
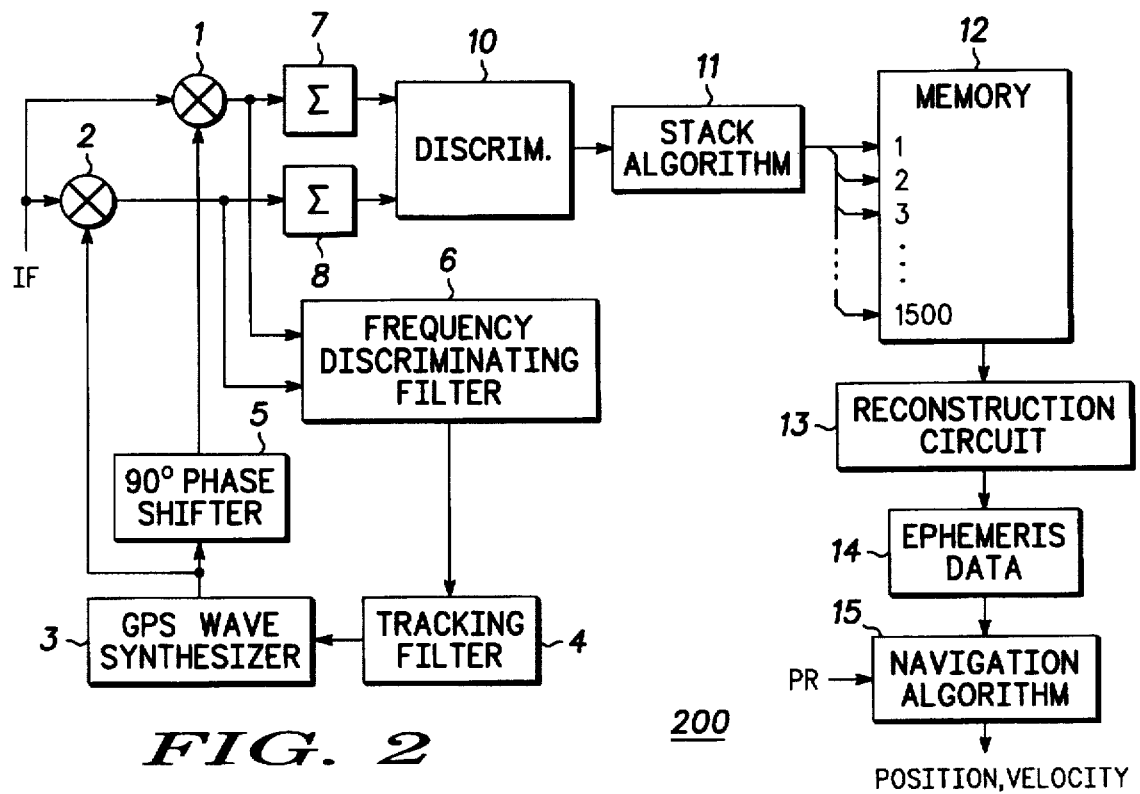
FIG. 2 illustrates portions of the GPS receiver of FIG. 1 in greater detail.
Figure 3:
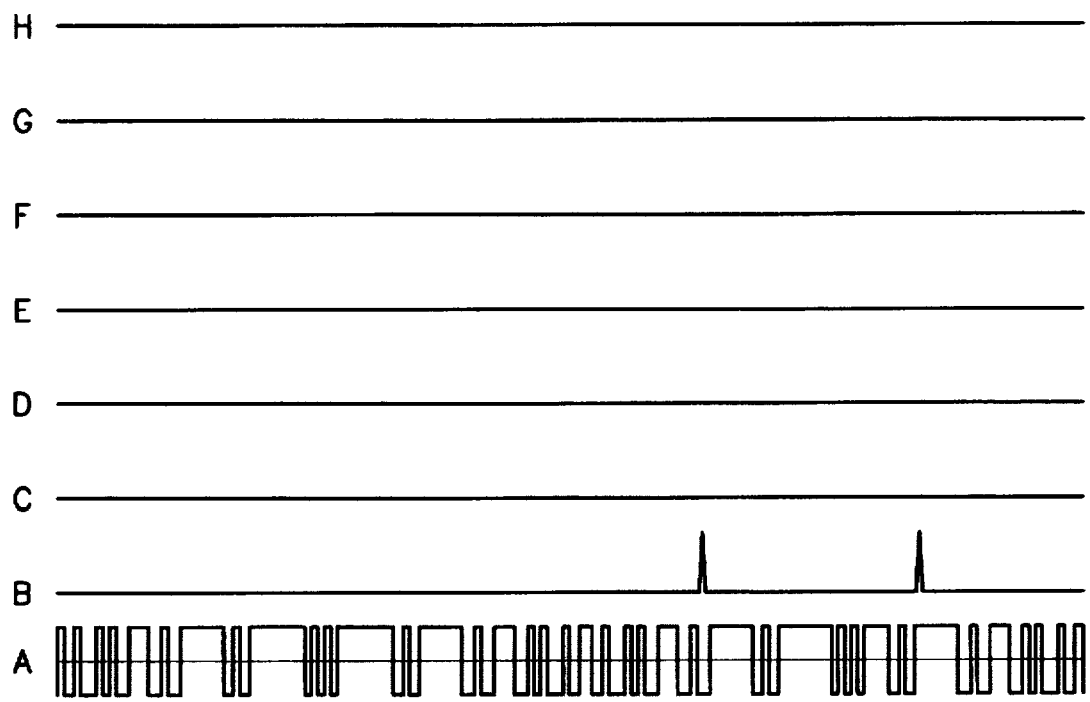
FIG. 3 shows illustrative bit patterns and plots of errors in detected bit transitions for various passes as defined by an equation in accordance with the invention for a first signal to noise ratio.

Turning now to FIG. 2, the baseband or Intermediate Frequency (IF) samples of GPS signals from the GPS receiver RF processing circuits are processed. The IF signal samples have been reduced from the L-band carrier frequency down to the intermediate frequency.

The baseband signals are applied to mixers or multipliers 1 and 2, respectively. Mixer 2 multiplies or mixes the baseband signals with a sine waveform. Mixer 1 multiplies the baseband signals with a cosine waveform. The sine waveform is generated by a GPS waveform synthesizer 3 which incorporates an NCO. A phase shifter 5 shifts the waveform output of the GPS waveform synthesizer 3 by 90 degrees to produce a quadrature signal. A typical sampling interval is 1 millisecond. The output of the mixers 2 and 1 are baseband, post correlation in-phase (I) and quadrature phase (Q) samples of the GPS signal which are modeled as:

$$I_K = A*D(t)*\cos(\phi_K) \quad [1]$$

$$Q_K = A*D(f)*\sin(\phi_K) \quad [2]$$

where

D(t) is the baseband data signal which is a function of time;

A is the amplitude of the baseband data signal; and $\phi$ is the phase angle of the GPS signal relative to the receiver clock.

The mixers 1 and 2 are of a type known in the art and utilized in GPS receivers. The waveform synthesizer 3, as well as the phase shifter 5 are likewise known in the art.

A discrimination function for frequency tracking is formed by manipulating the I and Q samples defined by equations 1 and 2 as follows:

$$y(f) = \sum_{k=1}^{20m} \{[Q_K I_{K-1} - I_K Q_{K-1}]/[I_K I_{K-1} + Q_K Q_{K-1}]\} = \quad [3]$$

$$\sum_{k=1}^{20m} \tan(\Delta \phi_K) \cong (\phi_{20m} - \phi_0)'$$

where m is a convenient integer.

For example, with m=50, the averaging of phase change is over 50 bit times or 1 second. With this process, the bit transitions are 'invisible' and do not affect the estimate of average phase change defined by the discrimination function. This discrimination function is provided by a frequency discriminator filter 6 which has inputs which receive the I and Q samples from the outputs of the multipliers 1 and 2 and operates on the I and Q samples to produce an output y(f) as defined by equation 3. The frequency discriminator filter 6 calculates the phase differences over short intervals of time and stacks those differences together to get a measure of frequency and smoothes the stacked samples in accordance with equation 3.

The frequency discriminator filter 6 in turn has its output fed to a tracking filter 4. The tracking filter 4 in turn is connected to the input of the GPS waveform synthesizer 3. The frequency discriminator filter 6 receives subsequent samples of I and Q and determines the change in phase over a short interval time. The phase differences are averaged. Frequency discriminator filter 6 output, y(f), is applied to the tracking filter 4 which adjusts the frequency of the waveform synthesized by GPS wave form synthesizer 3 by controlling the NCO contained therein.

The loop formed by frequency discriminator filter 6, tracking filter 4 and GPS waveform synthesizer 3 serves to stabilize the I and Q samples. Without this loop, the samples would be modulated in frequency. Thus, the loop formed by the multipliers 1 and 2, frequency discriminator 6, tracking filter 4 and GPS waveform synthesizer 3 removes the frequency content.

Despite the improved tracking capability of the loop described above, to accommodate the high interference or jamming environment or low signal environment such as found under tree canopy, reliable demodulation of the data from the signal is still limited as the J/S ratio approaches the theoretical limit of 53.1 dB. When the GPS receiver attempts to lock on to the GPS satellite signals for the first time with no initial ephemeris of the satellites, decoding of modulated data from the GPS navigation message is essential before a position can be derived from the satellites. With higher J/S levels, the dwell time for each of the search positions in the code must be increased to compensate for higher interference levels. However, the data bits cannot be averaged over intervals longer than the GPS bit period of 20 milliseconds.

In accordance with the principles of the invention, data demodulation under conditions of severe interference or jamming can be significantly enhanced by utilizing the repetition in the broadcast frames of navigation data. By using a frequency lock mode to track the average phase of the GPS signal, the S/N ratio in each bit interval can be increased by coherently "stacking" the appropriate energy in each of the bit intervals received over multiple frames of data. Each 30 second frame of data broadcast from the GPS satellite contains exactly 1500 bits of data, most of which are repeated each 30 seconds for a period of 1 hour or more. Most of the data is repeated from frame to frame because it is intended that the GPS system would be immediately available. Therefore, under adequate conditions (a low I/S) it is only necessary to receive the data for 30 seconds, after which the position of the GPS receiver/antenna may be determined. The data that is broadcast in that 30 seconds is the data that is required to calculate precisely where a GPS satellite is at any moment in time. The navigation data is referred to as ephemeris data. The navigation data is repeated every 30 seconds to permit a GPS receiver to derive the receiver's position within a short time. Other data includes the almanac for the other satellites in the constellation.

The almanac is a set of data similar to a table that allows the positions of all the other satellites in the constellations to be determined as a function of time. In addition, other information, which is classified, pertaining to the GPS system is included in each frame of data. The data gets changed once an hour or less frequently to account for variations as the satellite drifts in the satellite constellation. The data is uplinked from the ground and activated at some prescribed time.

Under severe interference, jamming or otherwise adverse signal conditions due to foliage attenuation, tracking of the GPS carrier can only be achieved via frequency tracking mode. While in this mode, the instantaneous measured phase will wander within the time frame of the 'receiver dwell time' (inverse tracking bandwidth). Because of this phase wander a data demodulation process is used to detect bit transitions. An efficient bit transition detector is based on the dot product of adjacent 20 millisecond averaged samples. These 20 millisecond averaged samples are expressed as:

$$I_i = (1/20) * \sum_{K=20i}^{K=20i+20} A_K * D_K * \cos(\phi_K) = \bar{A}_i * \bar{D}_i * \cos(\tilde{\phi}_i) + N_{I_i} \quad [4]$$

$$Q_j = (1/20) * \sum_{K=20j}^{K=20j+20} A_K * D_K * \sin(\phi_K) = \bar{A}_j * \bar{D}_j * \sin(\tilde{\phi}_j) + N_{Q_j} \quad [5]$$

where $N_I$, and $N_Q$, are noise components of the I and Q samples.

The summation circuits 7 and 8 form the Qj and Ij samples, respectively, in accordance with equations 5 and 4, respectively.

The summation circuits 7 and 8 sum the respective Q and I samples over a 20 millisecond time interval corresponding to the length of one data bit. Equation 4 is the output of summation event 8 and equation 5 is the output of summation event 7. A discriminator 10 receives the Ij and Q samples and detects phase transitions between 20 ms samples by forming the dot product of time adjacent 20 millisecond I/Q samples:

$$x(j) = [I_j I_{j-1} + Q_j Q_{j-1}] = A^{2} * D_j * D_{j-1} * \cos(\phi_j - \phi_{j-1}) + \Psi_j \quad [6]$$

where $\Psi_j$ is the noise in this measurement.

With this function, the sign of $x_j$ may be used directly as a means for detecting a bit transition. Note that in the case of a noisy situation such as an intentional jamming situation, the noise in equation [6] will compete with the signal and cause errors to occur in the detection of the bit transitions.

In accordance with the principles of the invention, a memory 12 is used to store the equivalent of one full frame or 1500 bits of GPS data. Enhanced S/N ratio is achieved by "Stacking" the bit transition values x(j) (i.e., averaging individual bit transition measurements) in the stored frame. Stacking in memory 12 is provided by the stacking algorithm function 11. After processing m frames of data each entry $X_m$ stored in the memory 12 is defined as:

$$\bar{X}_m(n) = \sum_{j=1}^{m} x(1500 * [j-1] + n) \qquad [7]$$

where n is the bit position in a frame; and
$1 \leq n \leq 1500$.

The averaging as defined by equation [7] is performed prior to the actual 'detection' of the bit transition (i.e., making the decision as to whether a transition has or has not occurred). Most of the 1500 data bits in subsequent frames of the navigation message are identical from one frame to the next frame except at the rollover of the hour, and therefore the effect of noise in equation [6] is reduced by averaging the corresponding samples in the frame. For example, if samples defined by equation [6] were stacked (i.e., added) over 20 frames of 1500 bits each, a reduction in the noise (both jamming and receiver noise) of 13 dB would be achieved. This reduction of noise would be significant in a hostile search and rescue environment.

Implementation of this technique involves a final bit detection process which comprises the formation of the reconstructed bit stream, D(n), from the transition table by the reconstruction circuit 13 according to the relation:

$$\hat{D}(n)\hat{D})n-1)*sgn[\bar{X}(n-1]; \; n=2, 3, 4, \ldots 1500 \qquad [8]$$

and recognizing errors by using the parity error detection that is integral with the GPS data modulation. Formation of the bit stream according to equation [8] above could be performed concurrently with the stacking process of equation [7]. Stacking and bit stream updating would continue until all errors in the ephemeris data table were eliminated. FIGS. 3, 4, 5 and 6 illustrate the improvement that is obtained using the stacking algorithm described by Equation [7], in which the individual measurements of bit transition are defined by Equation [6] are summed to form a 'stacked' bit transition function, $\bar{X}_m(n)$ which is a more reliable indication of bit transitions. In each of FIGS. 3, 4, 5 and 6, wave frame A illustrates a sample bit pattern. This bit pattern alternates between a state of 0 and 1 corresponding to a typical bi-phase modulation as used with the GPS signal. Directly above wave frame A is a plot B of the errors in the detected bit transition, using only a single pass of data, with the given S/N, using the relation of Equation [6]. Error events are indicated by each of the spikes in the otherwise straight line from left to right of the figure. Note that in FIG. 3, there are 2 bit transition errors during a total of 200 bit intervals when using Equation [6] without stacking multiple passes as defined by Equation [7]. Trace C is a plot of the Bit change detection errors when 2 passes are stacked, i.e., with m=2 in Equation [7]. Similarly, above this plot are plot traces for D, E, F, G and H the situations when 3, 4, 5, 6, and 7 passes are stacked together prior to bit transition detection. Note that in FIG. 3, with an input S/N of 7.6 dB, there were no errors in detection of bit transitions when 2 or more passes were stacked.

Figure 4:
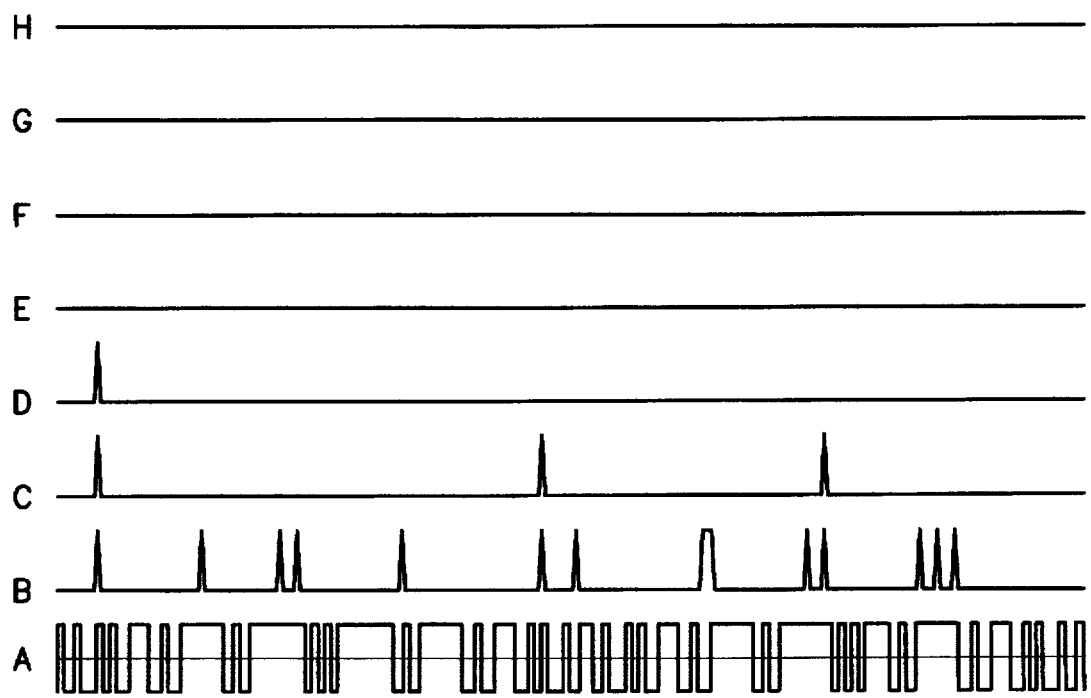
FIGS. 4, 5 and 6 illustrate bit patterns and plots of errors in detected bit transitions for various passes as defined by an equation in accordance with the invention for second, third and fourth signal to noise ratios.
Figure 5:
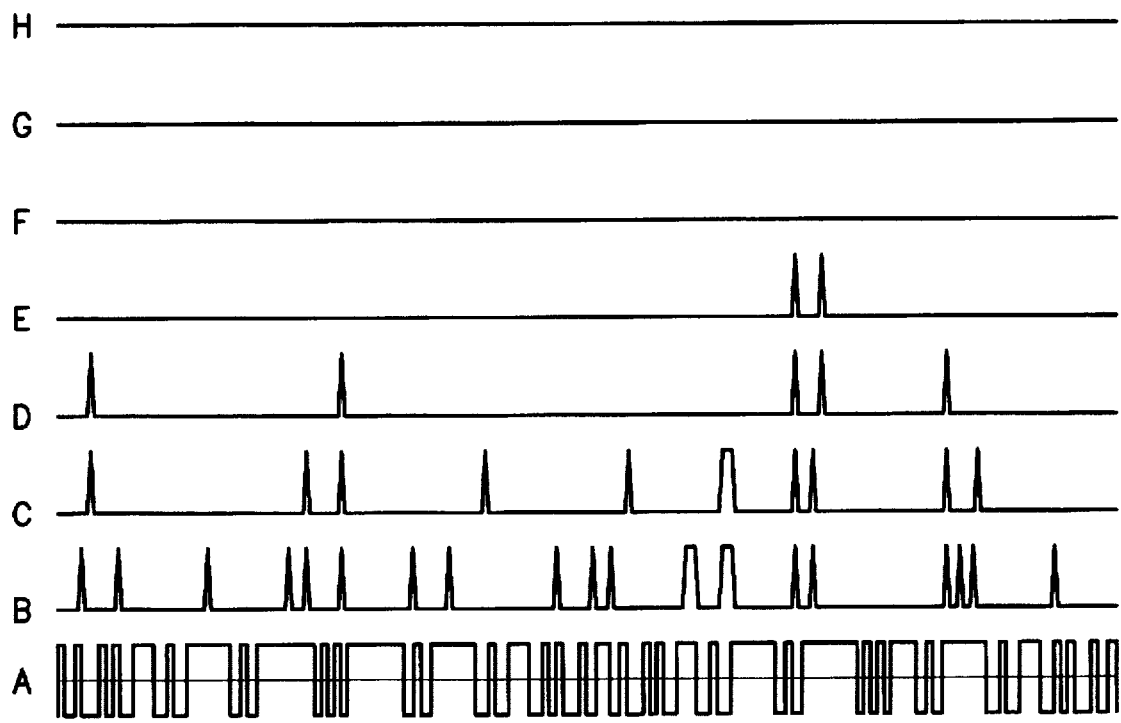
Figure 6:
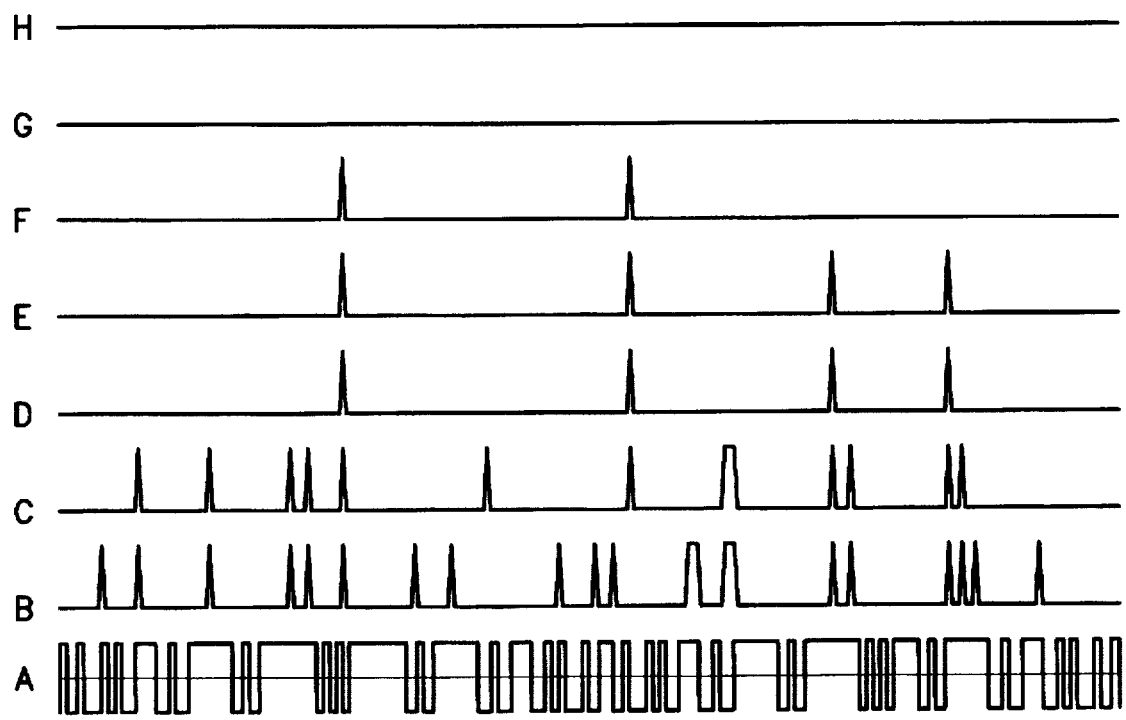

The situation changes when more noise is present in the measurements. FIG. 4 illustrates the case for S/N ratio of 3.5 dB and it is clear that significantly more errors occurred. In this case, no bit transition detection errors occurred when 4 or more passes were stacked. When the S/N ratio is reduced to the range of 1 dB as shown in FIGS. 5 and 6, considerably more errors occur and variability is apparent in the results. In these cases, 6 passes must be stacked to suppress all errors in detection of the bit transitions. FIG. 5 illustrates the bit change errors with 0.8 dB S/N prior to detection and FIG. 6 illustrates bit change errors with 1.1 dB S/N ratio prior to detection. A subset of the data stored in the memory is the ephemeris data and is captured in the ephemeris data file 14.

The satellite position requires a certain number of parameters to characterize the orbit as a function of time and those parameters are all resident in this ephemeris data file.

The stacker algorithm defines a measure of the change in the sign of the bit which is referred to as x(j) for each bit. That measure of change of the bit is an undetected quantity and it contains noise. The measure of change is averaged over multiple frames of data. The GPS data bits are then reconstructed by a simple detection process of looking at the change in the sign of the accumulated changes. The reconstructed set of data are then used to perform the satellite position calculation.

The advantage of using this stacking method is theoretically given by the log of the number of passes that are stacked prior to detection. Thus, for 7 passes stacked prior to detection, one could expect an 8 dB improvement. Such an improvement could be achieved by stacking 3.5 minutes of GPS message bit transition detection data according to Equations [6] and [7].

It should be apparent to those skilled in the art, that although the invention has been described in terms of specific functional blocks, the functions provided by these blocks may in alternative embodiments may be implemented in a GPS processor which is an integral portion of a GPS receiver. Alternatively, a separate signal processor may be used to implement one or more of the functions. GPS receivers utilizing processors are well known in the literature and several are described in the aforementioned U.S. Pat. No. 5,519,403.

While the invention has been described in conjunction with a specific embodiment, many alternatives, modifications and variations will be apparent to those skilled in the art in light of the forgoing description without departing from the spirit or scope of the invention. Accordingly, the invention is intended to embrace all such alternatives, modifications and variations that fall within the spirit and scope of the invention.

What is claimed is:

1. A method for operating a GPS receiver, comprising:
   (a) receiving a first frame of GPS data bit transitions;
   (b) storing said first frame of data bit transitions in a memory;
   (c) receiving a second frame of GPS data bit transitions, at least a portion of said data bit transition of said second frame duplicating data bit transitions of said data bits of said first frame;
   (d) averaging each said data bit transition of said second frame with a corresponding data bit transition of said first frame stored in said memory to produce a frame of averaged data bits;
   (e) storing said frame of averaged data bit transitions in said memory;
   (f) repeating steps (a) through (e) as predetermined number of times; and
   (g) utilizing said stored frame of averaged data bit transitions to provide GPS data.

2. A method in accordance with claim 1, comprising:
   (h) reconstructing a GPS data stream from said stored frame of averaged data bit transitions.

3. A method in accordance with claim 2, comprising:
   (i) utilizing parity error detection to recognize errors in said reconstructed GPS data stream.

4. A method in accordance with claim 3, comprising:
   (j) repeating steps (a) through (i) until all errors in said reconstructed data stream are eliminated.

5. A method in accordance with claim 4, wherein:

said reconstructed data stream is used to construct an ephemeris data table.

6. A method in accordance with claim 3, comprising:

(j) repeating steps (a) through (i) to correct errors resulting from a low signal-to-noise ratio of GPS signals carrying said GPS data bits.

7. A receiver for receiving GPS signals and for providing output information derived from GPS data, said receiver comprising:

a memory for storing at least one frame of data;

a frequency controlled loop for producing post correlation in-phase (I) and quadrature (Q) phase samples of said GPS signals;

a first summation circuit for summing said I samples occurring within a predetermined time interval corresponding to the time interval for one GPS data bit to produce an averaged I sample including a noise component;

a discriminator circuit for receiving said averaged I and Q samples and detecting phase transitions between time adjacent data bits from time adjacent ones of said I averaged samples and between time adjacent ones of said averaged Q samples;

stacking algorithm circuitry for calculating an average phase transition for each data bit of a frame of data by stacking a current phase transition value with an accumulated phase transition value stored in said memory for a corresponding data bit position; and circuitry for reading each said average phase transition for a frame from said memory to form a reconstructed GPS data bit stream.

8. A receiver in accordance with claim 7, comprising:

circuitry for storing ephemeris data extracted from said reconstructed GPS data bit stream.

9. A receiver in accordance with claim 7, wherein:

said receiver is a search and rescue receiver.

10. A GPS receiver, comprising:

means for generating an in-phase (1) and a quadrature-phase (Q) component for each bit of GPS data in a frame of GPS data bits;

a discrimination apparatus for receiving said I and Q components and detecting phase transitions between time adjacent ones of said I and Q components;

a memory for storing at least one frame of accumulated phase transitions for each data bit position in said frame of GPS data bits;

a stacking algorithm apparatus for calculating an accumulated phase transition value for each said data bit position and for storing each accumulated phase transition value in said memory; and an apparatus for reading said accumulated phase transition values from said memory to reconstruct a GPS data bit stream.

11. A receiver in accordance with claim 10, comprising:

apparatus for utilizing said reconstructed GPS data stream to extract position information.

12. A receiver in accordance with claim 10, wherein:

said stacking algorithm apparatus comprises a processor.

13. A method of processing GPS signals, comprising:

processing received GPS signals to generate an in-phase (I) and a quadrature-phase (Q) component for each bit of GPS data carried by said GPS signals, said GPS data bits being arranged as a frame of GPS data bits;

discriminating said I and Q components to detect phase transitions between time adjacent ones of said I and Q components;

forming an accumulated phase transition value for each bit position of said frame; and utilizing said accumulated phase transition values to produce a GPS data frame.

14. A method in accordance with claim 13, comprising:

storing said accumulated phase transition value for each bit position in a memory.

15. A method in accordance with claim 14, comprising:

reading said memory to produce a GPS data stream.

16. A method in accordance with claim 13, wherein:

said I and Q components are each generated by determining a dot product of averaged samples of said respective components.

17. A method in accordance with claim 13, wherein:

said I component is generated by forming a dot product of I component samples occurring within a predetermined time period.

18. A method in accordance with claim 17, wherein:

said Q component is generated by forming a dot product of Q component samples occurring within said predetermined time period.

19. A method in accordance with claim 18, wherein:

said predetermined time period is determined by a GPS data rate.

20. A method in accordance with claim 19, wherein:

said predetermined time period is 20 milliseconds.

* * * * *